Nov. 27, 1934.  A. GRABELSKY  1,982,096
EYEGLASS MOUNTING
Filed May 12, 1934  2 Sheets-Sheet 1
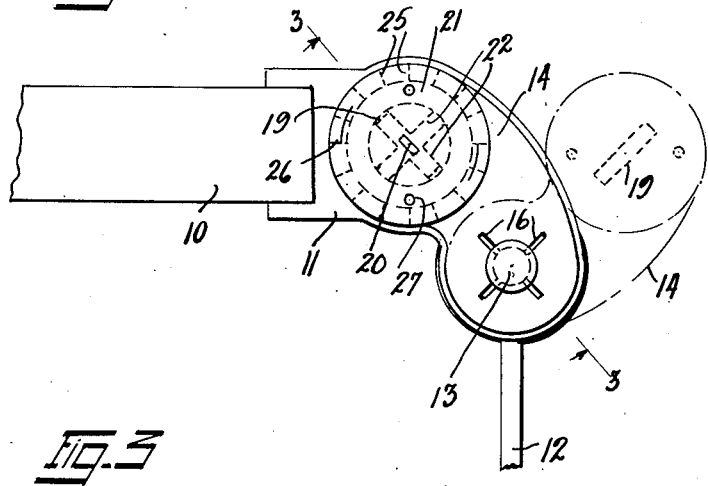
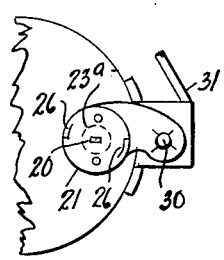
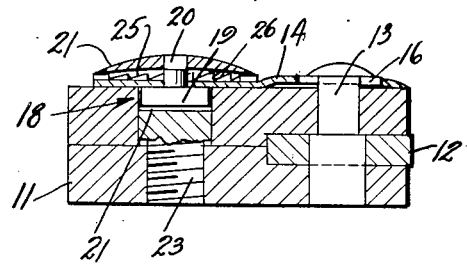
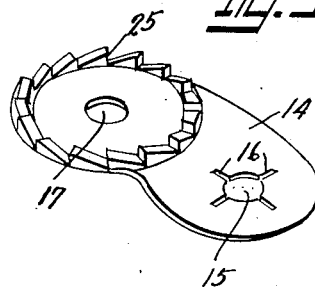
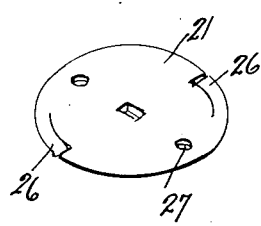
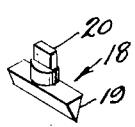
INVENTOR
Abraham Grabelsky
BY Maurice Bloch
ATTORNEY Nov. 27, 1934.  A. GRABELSKY  1,982,096
EYEGLASS MOUNTING
Filed May 12, 1934  2 Sheets-Sheet 2
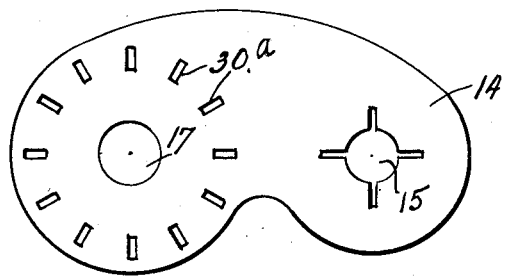
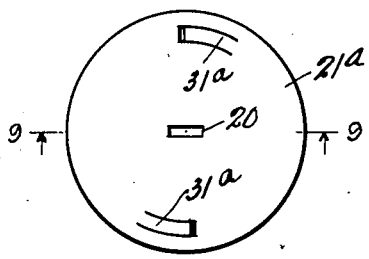
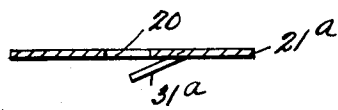
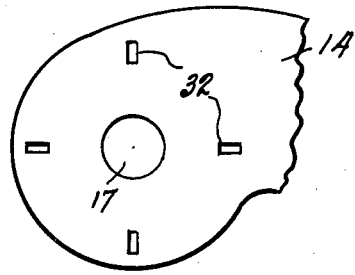
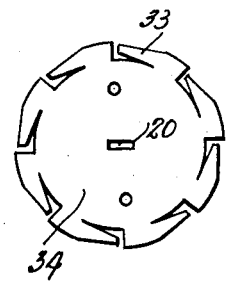
INVENTOR
Abraham Grabelsky
BY Maurice Bloch
ATTORNEY Patented Nov. 27, 1934

1,982,096

UNITED STATES PATENT OFFICE 1,982,096

EYEGLASS MOUNTING

Abraham Grabelsky, New York, N. Y.

Application May 12, 1934, Serial No. 725,235

4 Claims. (Cl. 151—13)

This invention relates to eye glass mountings and has for one of its objects the provision of means for locking the screws of such mountings against rotation so as to prevent their loosening.

Another object of the invention is to provide such a mounting with screw locking means said means comprising a pivotally mounted plate frictionally yet pivotally mounted at one end on a stud and provided at its opposite end with a tongue adapted to be brought into engagement with the screw slot so as to prevent rotation and the resultant loosening of same in the mounting.

A further object of the invention is to provide means to limit the movement of said tongue so that it may only be moved in the tightening direction of said screw.

Still another object of the invention is to provide such means which is equally adapted to be used in conjunction with rimmed as well as rimless glasses.

Another object is to produce a device of the character described in which the maximum simplicity of construction and operation is secured.

Other objects and advantages will appear as the nature of the improvements is better understood, the invention consisting substantially in the novel arrangement and co-relation of parts herein fully described, and illustrated in the accompanying drawings, wherein similar reference characters are used to describe corresponding parts throughout the several views, and then finally pointed out and specifically defined and indicated in the appended claims.

The disclosure made the basis of exemplifying the present inventive concept suggests a practical embodiment thereof, but the invention is not to be restricted to the exact details of this disclosure, and the latter, therefore, is to be understood from an illustrative, rather than a restrictive standpoint.

The inventive idea involved is capable of receiving a variety of mechanical expressions, one of which, for the purpose of illustration, is shown in the accompanying drawings, in which Figure 1 is a fragmental top plan view of a rimmed eye glass mounting showing my improved screw locking means as applied thereto.

Fig. 2 is a fragmental front view of a rimless mounting showing my invention as applied thereto.

Fig. 3 is a section view taken on line 3—3 Fig. 1.

Fig. 4 is a perspective view of the pivotal lever of the locking device.

Fig. 5 is a perspective view of the tongue directional movement limiting plate.

Fig. 6 is a perspective view of the locking tongue stud.

Fig. 7 is a top plan view of a modified form of the pivotal lever.

Fig. 8 is a top plan view of the locking disc used in connection therewith.

Fig. 9 is a sectional view of the said disc taken on line 9—9, Fig. 8.

Fig. 10 is a fragmental top plan view of a further modified form of the pivotal lever and Fig. 11 is a top plan view of the locking disc used therewith.

The loosening of the screws in eye glass mountings as is well known causes great inconvenience to glass wearers and very often such loosening of the screws causes the glasses to hang down and out of proper position thus distorting the vision of the wearer. It is to obviate this serious defect that I have perfected my invention.

Referring now to the drawings in detail 10 indicates a portion of an eye glass rim to the outer end of which there is suitably secured the usual temple cable holding bracket 11 in which the temple cable 12 is mounted upon a stud or rivet 13. Also mounted on the said stud 13 is a resilient arm 14 from whose stud engaging hole 15 there radiate slots 16 to provide frictional engagement between the said stud 13 and bracket 11.

The said arm is provided at the end opposite its stud engaging hole 15 with a second hole 17 (Fig. 4) through which there passes loosely a stud 18 provided at its lower end with a tongue 19 whose upper end 20 is secured in a disc 21. The said tongue 19 fits into a slot 22 of the cable tightening screw 23 in the bracket 11 to prevent the accidental loosening of the said screw.

In inserting the screw 23 into the bracket 11, the screw slots 22 are not always in the same position; it is therefore necessary to so construct the locking device that the tongue 19 can be brought into alinement with the said slots no matter what position they assume. I have therefore mounted the tongue carrying stud loosely in the arm 14 so as to permit of rotation of the said stud in the hole 17. However it is desirable that this rotation be in the tightening direction of the screw 23 so as to prevent the loosening of the said screw. For this reason I have provided the arm 14 with ratchet teeth 25 and the disc 21 with engaging pawls or dogs 26 to limit the movement of the said tongue bearing stud to clockwise direction. The tongue 19 is brought into desired position by means of a spanner wrench inserted into the openings 27 in the disc provided for that purpose. Instead of the said holes a slot may be provided and a screw driver used instead of the wrench.

In Fig. 2 I have shown my invention as applied to the lense holding screws of frameless eye glasses. In this form of my invention I provide a rivet 30 in the nose piece or bridge 31 upon which I mount the lever 14 disc 21 and tooth carrying stud 18 for locking the eye glass holding screw 23a.

If it is desired to disengage the locking device from the screw with which it is in engagement the lever 14 is sprung upwardly and rotated into the dot and dash position Fig. 1.

In Figs. 7, 8, and 9 I have shown a modified form of my invention wherein the lever 14 instead of being provided with teeth has a plurality of cutouts, or detent notches 30a in which the dogs or teeth 31a of the locking disc 21a operate.

In Figs. 10 and 11 I have shown a further modified form of my invention wherein the lever 14 is provided with four cutouts 32 which are engaged by the teeth 33 of the locking plate 34 used in connection with this form of the invention.

From the foregoing it will be seen that I have provided a simple yet efficient screw lock for eye glass mountings which will prevent the accidental loosening of the eye glass screws, and one which can be readily adjusted to any position that the screw slot assumes.

Having described my invention what I claim as new and desire to secure by Letters Patent is:

1. In an eye glass mounting, a screw, a lock therefor comprising a lever pivotally mounted at one end thereof on the mounting, a serrated area at the opposite end of the said lever, a stud pivotally mounted at the said last mentioned lever end, a tongue on the said stud for engagement with the screw, and a toothed disc carried by the said stud for engagement with the lever serrations as and for the purpose specified.

2. In an eye glass mounting, a lock therefor comprising a pivot in the said mounting, a resilient lever frictionally mounted at one end thereof on the said pivot, a multiple slotted screw, ratchet teeth at the opposite end of the said lever, a stud pivotally mounted at the said last mentioned lever end, a tongue on the said stud for engagement with the screw slots, a disc on the stud, and a dog on the disc to limit the direction of rotary movement of the said tongue carrying stud.

3. A screw lock for an eyeglass mounting comprising a lever pivotally mounted at one end thereof, on the mounting, an adjustably mounted tongue carrying stud at the other end of the said lever for engagement with the screw and one way detent means for locking the said stud in adjusted position.

4. In an eye glass mounting, a screw, a lock therefor comprising a lever pivotally mounted at one end thereof on the mounting, an area at the opposite end of the said lever having detent notches therein, a stud pivotally mounted at the said last mentioned lever end, a tongue on the said stud for engagement with the screw, a disc carried by the said stud, and teeth on the said disc for the purpose specified.

ABRAHAM GRABELSKY.